United States Patent [19]

Park

[11] 4,249,683
[45] Feb. 10, 1981

[54] COMBINATION LADDER AND SPARE TIRE CARRIER

[76] Inventor: John R. Park, 25895 Miner Rd., Elkhart, Ind. 46514

[21] Appl. No.: 111,671

[22] Filed: Jan. 14, 1980

[51] Int. Cl.³ .......................... B60R 3/00; E06C 5/02; E06C 7/08
[52] U.S. Cl. .............................. 224/42.12; 224/42.21; 224/310; 182/93; 182/228; 414/466
[58] Field of Search ............... 224/42.12, 42.13, 42.21, 224/42.24, 42.28; 280/769, 163, 166, 291; 182/93, 95, 127; 414/463, 466

[56] References Cited

U.S. PATENT DOCUMENTS

| 3,362,597 | 1/1968 | Beach, Jr. | 224/42.21 |
| 3,613,971 | 10/1971 | Betz | 224/42.21 X |
| 3,672,549 | 6/1972 | Chorey | 224/310 |
| 3,944,024 | 3/1976 | Adas | 182/228 X |
| 3,999,673 | 12/1976 | Anderson | 224/310 X |
| 4,193,477 | 3/1980 | Broyles | 182/93 X |

Primary Examiner—Steven M. Pollard
Attorney, Agent, or Firm—Oltsch, Knoblock & Hall

[57] ABSTRACT

A combination ladder and spare tire carrier for a vehicle in which the spare tire carrier is connected to the inside of the ladder and the ladder pivotally connected to a wall of the vehicle whereby the ladder may be pivoted from an upright locked position into an inclined lower position to expose the spare tire carrier.

2 Claims, 7 Drawing Figures

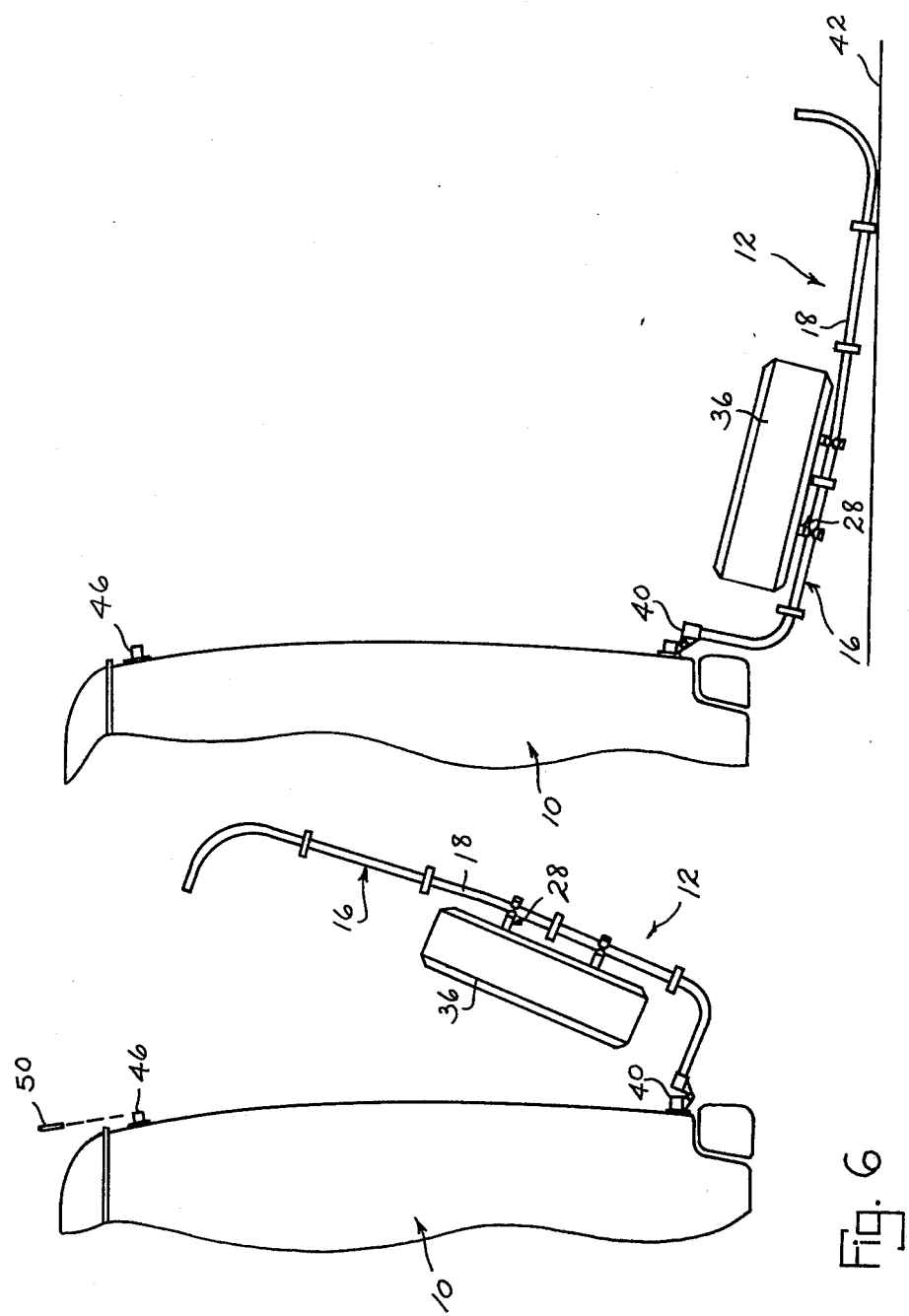

COMBINATION LADDER AND SPARE TIRE CARRIER

SUMMARY OF THE INVENTION

This invention relates to a combination ladder and spare tire carrier for a vehicle.

In this invention the spare tire carrier is mounted to the inside of the ladder as it is normally positioned in connected form to a wall of the vehicle. The ladder is pivotal about a lower hinge connection and is shiftable from its upright secured position with the spare tire carrier being positioned between the ladder and the vehicle wall into a lower inclined position which exposes its tire carrier to enable the user thereof to remove the tire carried by the carrier.

Heretofore ladders and spare tire carriers in separated forms have been utilized with motor vehicles such as vans and mini-motorhomes. On occasion there simply is not enough room along a wall, such as a side or end wall, of the vehicle to accommodate both a ladder and a separately constructed spare tire carrier. Additionally, elaborate locking means have been incorporated into separately constructed tire carriers to prevent the theft of the spare tire. Through this invention, the ladder and spare tire carrier are combined thereby conserving the amount of wall area required for the ladder and carrier. Additionally, by positioning the tire carrier so that it is carried between the ladder and a wall of the vehicle with the ladder secured in its upright position, theft of the spare tire is prevented without the use of elaborate means for locking the tire to the carrier. The combination ladder and spare tire carrier has a weight which is less than the combined weight of a ladder and a separate spare tire carrier, thus decreasing the overall weight of the carrying vehicle and improving its fuel economy.

Accordingly, it is an object of this invention to provide a combination ladder and spare tire carrier for a vehicle, such as a van or mini-motorhome, in which the carrier and accommodating ladder are of economical construction.

Another object of this invention is to provide a combination tire and spare tire carrier which is for a motor vehicle and which, when connected to a wall of the vehicle, serves to secure the spare tire carried by the carrier against theft.

Another object of this invention is to provide a vehicle spare tire carrier which operates in conjunction with a ladder used with the vehicle and which is of simplified operation.

And still another object of this invention is to provide a combination ladder and spare tire carrier which is for a motor vehicle and which in such combination is of a reduced weight in comparison to the normally utilized separately constructed ladder and spare tire carrier.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 6 is a side view of the vehicle shown in fragmentary form with the ladder being disconnected and swung from its secured upright position as seen in FIG. 2 into an intermediary position.

FIG. 7 is a side view of the vehicle shown in fragmentary form with the combination ladder and spare tire carrier of this invention shown in its lowered position exposing the spare tire carrier.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 5:
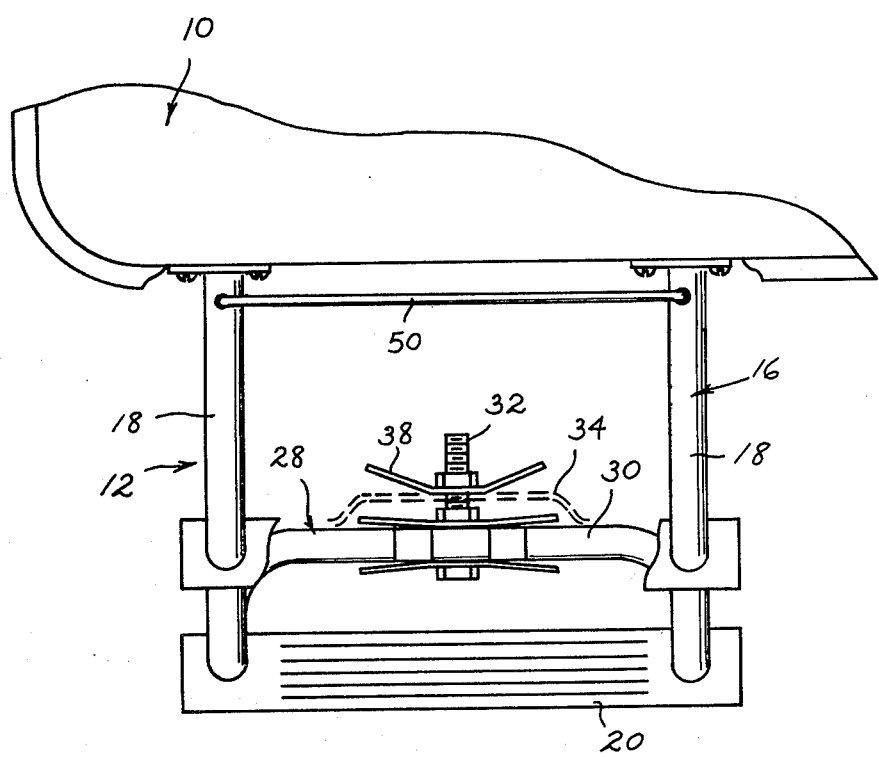
FIG. 5 is a top view of the combination ladder and spare tire carrier connected to the side of the vehicle.

In the figures, a van 10 is shown having the combination ladder and spare tire carrier 12 of this invention attached to an end wall of the van at its rear door 14. In the combination ladder and spare tire carrier 12 illustrated, ladder 16 thereof includes two parallel side pieces 18 which are interconnected by a plurality of spaced apart rungs or steps 20. Each side piece 18 of ladder 16 includes an upper end portion 22, a lower end portion 24, and an interconnecting central portion 26. The upper and lower end portions 22, 24 of ladder side pieces 18 are correspondedly bent with the side pieces each assuming a generally C-shaped configuration. Also forming a part of the combination ladder and spare tire carrier 12 is the carrier 28. Carrier 28 is connected to central portions 26 of ladder side pieces 18 and is located between the upper and lower end portions 22, 24 of the side pieces. Carrier 28 includes a frame part 30 to which is connected a securement bolt 32. The wheel 34 of a spare tire 36 is secured to the frame part 30 of carrier 28 by means of a wing nut 38 turned upon bolt 32 with the bolt extending through the center of spare tire wheel 34, as best illustrated in FIG. 5.

Figure 1:
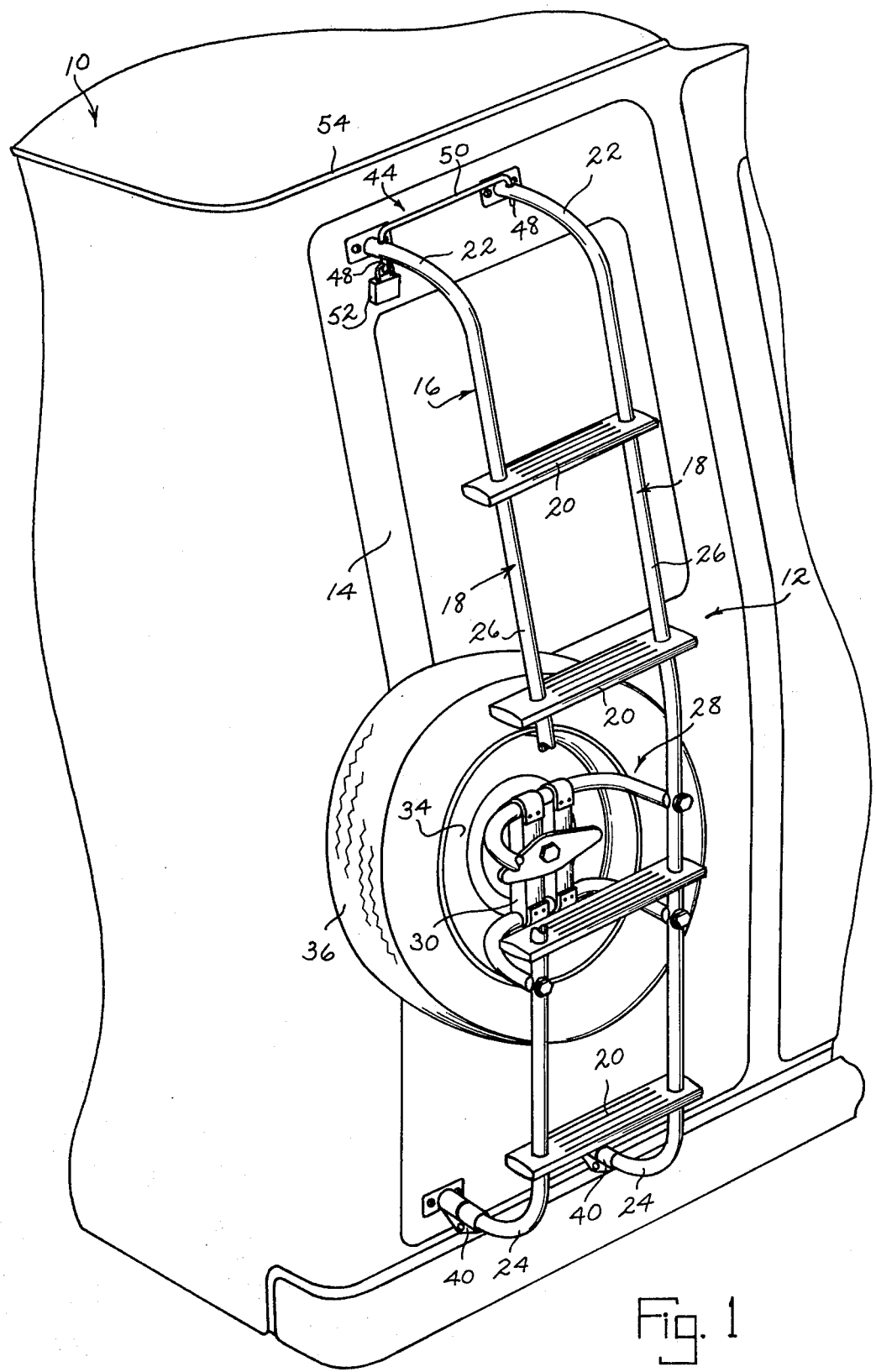
FIG. 1 is a perspective view of a fragmentary portion of a motor vehicle showing the combination ladder and spare tire carrier of this invention connected thereto.
Figure 2:
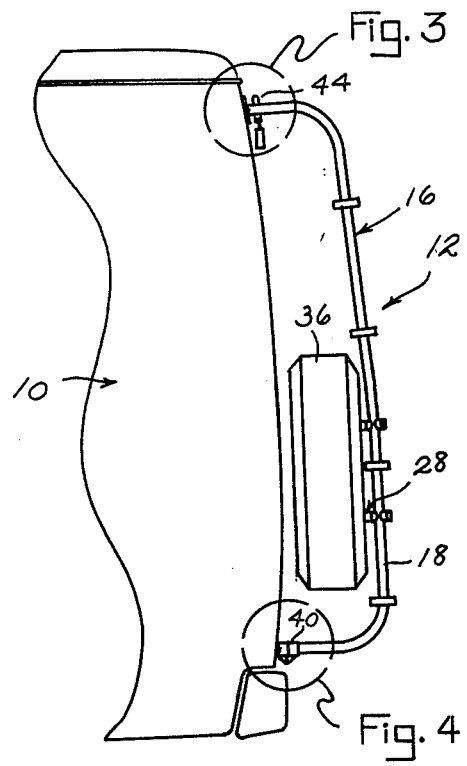
FIG. 2 is a side view of the motor vehicle of FIG. 1 shown in fragmentary form and having the combination ladder and spare tire carrier of this invention connected thereto.
Figure 3:
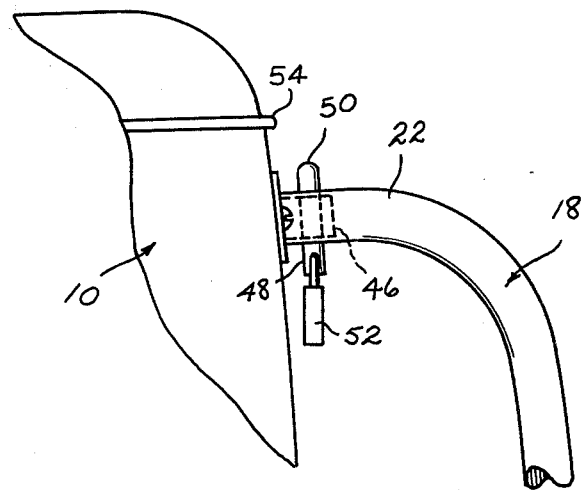
FIG. 3 is a fragmentary detailed view of that portion of FIG. 2 enclosed within the broken line circle designated.
Figure 4:
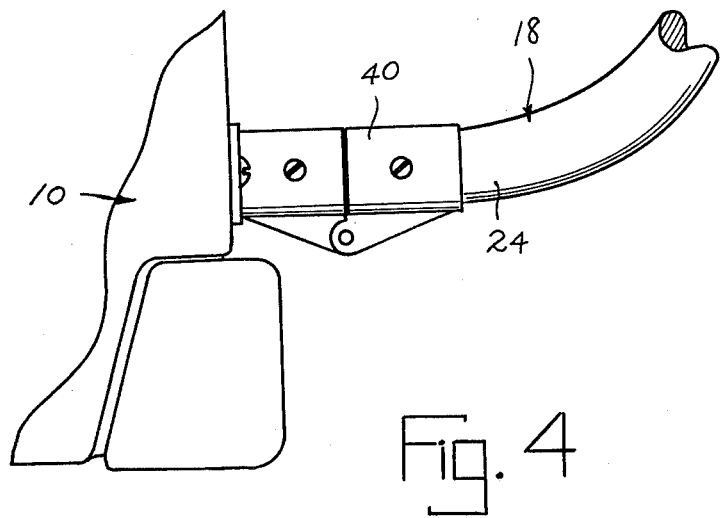
FIG. 4 is a fragmentary detailed view of that portion of FIG. 2 enclosed within the broken line circle designated.

Ladder 16 is secured to door 14 of van 10 at its side piece lower end portions 24 through a hinge part 40 connected to each side piece. Upper end portions 22 of ladder side pieces 18 are releasably secured to van door 14 near its top so as to enable ladder 16 to be swung from its generally vertical or upright position, available for climbing, as seen in FIGS. 1 and 2 about hinge parts 40 into an inclined or lowered position resting upon the pavement or ground 42 as seen in FIG. 7. With ladder 16 in its inclined position, the spare tire 36 secured to carrier 28 is exposed and accessible to allow the removal of the tire from the carrier upon removal of wing nut 38. When ladder 16 is in its upright position, spare tire 36 is located between central portions 26 of ladder side pieces 18 and door 14 of van 10 in a stored position which, due to the restricted area of clearance between the spare tire and the door of the van, prevents the tire from being removed from the carrier.

A locking device 44 serves to secure upper end portions 22 of ladder side pieces 18 to van door 14. This is accomplished in the preferred embodiment by the provision of a pair of male protrusions or foot pads 46. Pads 46 are positioned to fit into the hollow ends of ladder side pieces 18, which are preferably of tubular form, at their upper end portions 22, when the ladder is located in its upright position. Openings are formed in each foot pad 46 and over-fitting ladder side piece upper end portion 22 which are aligned when ladder 16 is located in its upright or vertical position. Through such aligned openings are inserted the down turned legs 48 of a locking bar 50. At least one of the legs 48 of locking bar 50 protrudes below its intersected ladder side piece upper end portion 22 and has a transverse bore therethrough. The shackle of lock 52 is passed through the transverse bore in the protruding bar leg to secure locking bar 50 to ladder 16 and engaging foot pads 46. In this manner, ladder 16 is secured in its upright position and is prevented from being pivoted away from door 14 of van 10 to allow unauthorized access to spare tire 36. To gain access to spare tire 36, lock 52 is removed from locking bar 50 and ladder 16 swung about hinge parts 40 through the position illustrated in FIG. 6 to the ground or pavement engaging position shown in FIG. 7.

As an added or separate security feature, the drip cap 54 of van 10 may be extended to overlie in close proximity foot pads 46 and the secured ends of upper end portions 22 of ladder side pieces 18 to prevent the upward removal of locking bar 50. In this construction, the only manner in which ladder 16 can be released for its pivoted movement would be first the unlocking and opening of door 14 with the door being pivoted so that locking bar 50 clears or is free from drip cap 54. At this time the locking bar 50 can be removed to allow the ladder to be pivoted into its inclined position fully clearing the bumper of the vehicle. Lock 52 can be optionally used with the extended drip cap.

It is to be understood that the invention is not to be limited to the details above given but may be modified within the scope of the appended claims.

What I claim is:

1. A combination ladder and spare tire carrier for a vehicle having a wall, said ladder comprising two generally parallel side pieces interconnected by a plurality of spaced apart steps, each side piece including an upper and a lower end portion and an interconnecting central portion, the upper and lower end portions of said ladder side pieces being correspondedly bent with the side pieces having generally C-shaped configurations, said carrier for the spare tire secured to said ladder and carried between said end portions and adjacent the central portion of the ladder side pieces, hinge means at the lower end portions of said ladder side pieces for connection to said vehicle wall, releasable securement means at the upper end portions of said ladder side pieces for connection to said vehicle wall wherein said ladder when connected to the vehicle wall with said carrier positioned between said wall and ladder side piece central portions is pivotable from its stored generally vertical position about said hinge means into a lowered position exposing said carrier.

2. The combination ladder and spare tire carrier of claim 1 wherein said securement means includes releasable locking means for securing said upper end portions of the ladder side pieces to said vehicle wall.

* * * * *